(No Model.) 2 Sheets—Sheet 1.
W. WATSON.
MACHINE FOR PICKING PEANUTS.
No. 445,664. Patented Feb. 3, 1891.
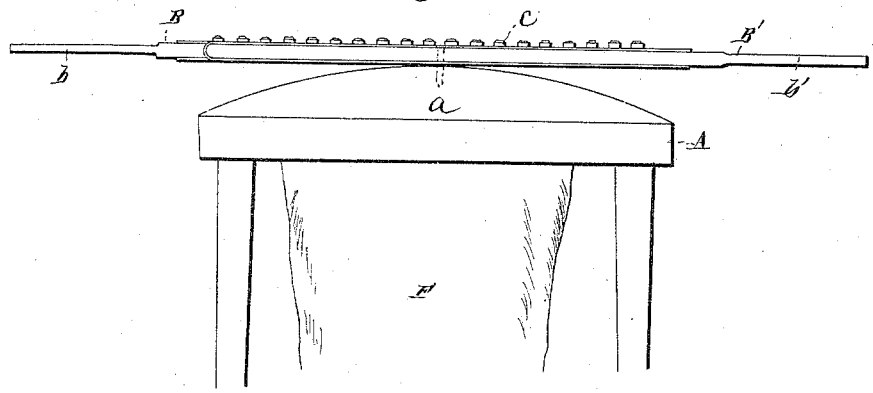
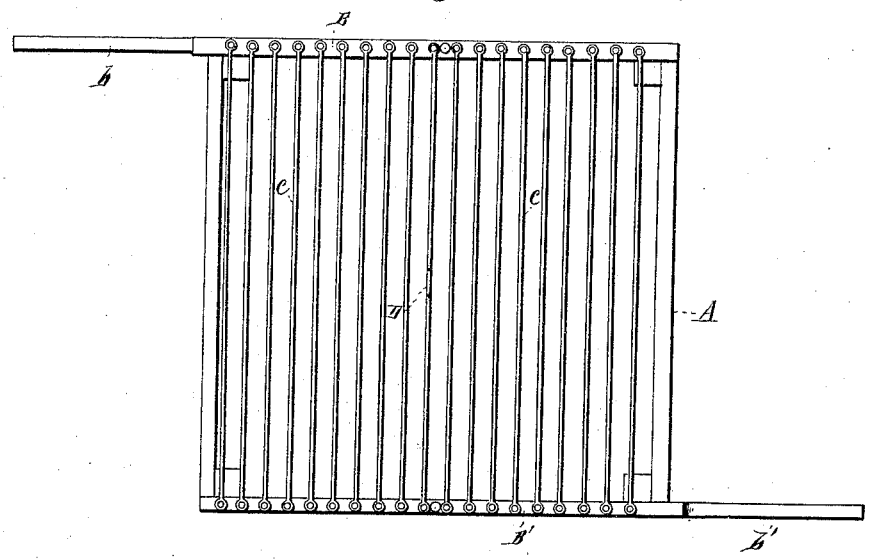
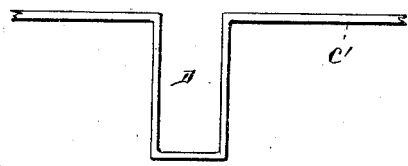
Witnesses
Chas. L. Taylor
Phil C. Mair
Inventor
Wheeler Watson
by E. W. Anderson
his Attorney

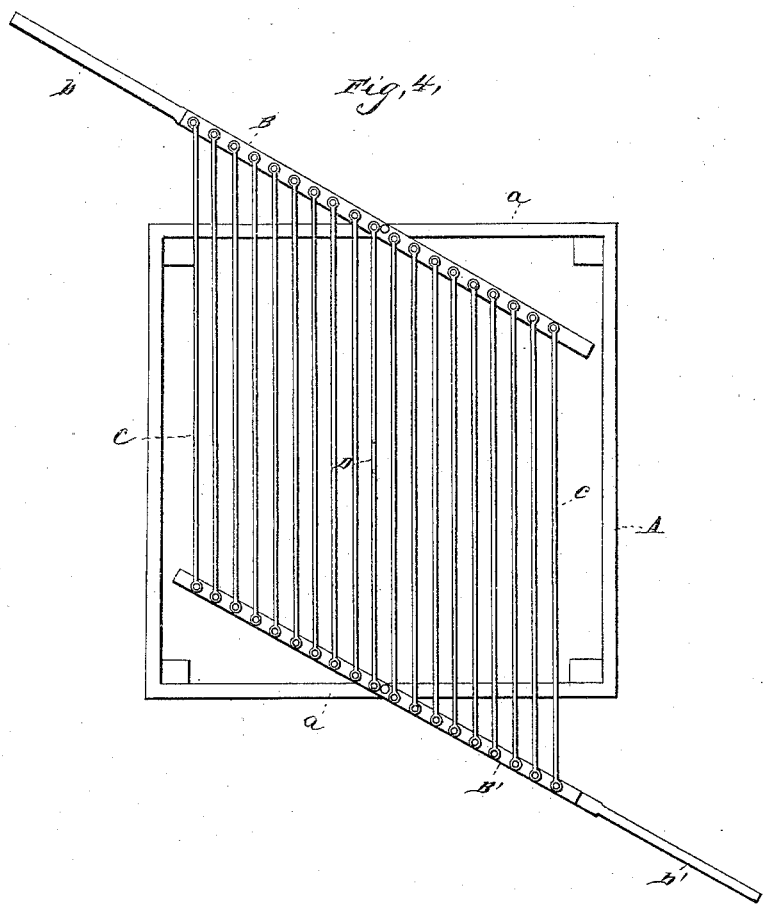

UNITED STATES PATENT OFFICE.

WHEELER WATSON, OF STRONG'S STATION, MISSISSIPPI.

MACHINE FOR PICKING PEANUTS.

SPECIFICATION forming part of Letters Patent No. 445,664, dated February 3, 1891.

Application filed October 31, 1890. Serial No. 369,884. (No model.)

*To all whom it may concern:*

Be it known that I, WHEELER WATSON, a citizen of the United States, and a resident of Strong's Station, in the county of Monroe and State of Mississippi, have invented certain new and useful Improvements in Machines for Picking Peanuts; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a side elevation. Fig. 2 is a top plan view. Fig. 3 is a detail view. Fig. 4 is a top plan view transposed.

The invention relates to certain improvements in peanut pickers or gatherers; and it consists in the novel construction and combination of parts hereinafter described.

In the accompanying drawings, A has reference to a table or frame, preferably of square or rectangular form, and having an open top. To two opposite ends of this table are secured the curved end pieces $a$, to the highest or central portion of each of which is pivoted a bar or lever B B', the handle portions $b$ $b'$ of which project laterally from the table in opposite directions. These bars or levers are connected to each other by the rods or wires $c$, separated from each other a short distance, the said wires or rods having a pivotal connection at each end with the said bars or levers. The central wire or rod $c'$ is bent at its central portion to form the downwardly-projecting angular loop D, the purpose of which will be hereinafter described.

The device is operated as follows: The peanut-vines are placed one at a time on the frame formed by the levers or bars and the wires or rods described, the peanuts dropping through and hanging beneath said wires or rods. One or both of the handle portions of the levers or bars are then operated to bring the frame to the position shown in Fig. 4, the pivotal connection of the wires or rods to B B' causing the former to assume position relatively nearer to each other than when the frame is in the position shown in Fig. 2. The tap-root of the vine, which otherwise would become crammed by the operation between the central rods or wires and prevent the free movement of the device, will fall between the side arms of the loop D, hereinbefore described, and thus present no obstruction to the movement of the parts. The vine is then pulled from the frame, the peanuts on which, being unable to pass upwardly between the rods or wires on account of their diminished distance, will be detached from the vines and fall through the open top of the table into the bag F, suspended thereunder, or into some other suitable receptacle. The bars or levers are then operated to bring the frame back into its original position to receive another vine.

Having thus described the invention, what I claim, and desire to secure by Letters Patent, is—

1. The peanut-picker having the pivoted bars or levers and the rods or wires pivotally connected at their ends to said bars or levers, one of said wires or rods having a depending loop or extension, substantially as and for the purpose described.

2. The peanut-picker comprising the bars or levers pivoted at opposite ends of a table or frame and having handle portions projecting laterally in opposite directions from said table or frame, and the wires or rods pivoted at their ends to the said bars or levers, one of said wires or rods being bent to form the depending loop, as and for the purpose described.

In testimony whereof I affix my signature in presence of two witnesses.

WHEELER WATSON.

Witnesses:
PHILIP C. MASI,
CHAS. L. TAYLOR.